May 13, 1930.　　S. M. WRIGHT ET AL　　1,758,344
SPINNER FOR FISH LURES
Filed June 9, 1928

Inventors
STANLEY M. WRIGHT
ANDREW D. McGILL
By R.H. Galbreath
Attorney

Patented May 13, 1930

1,758,344

UNITED STATES PATENT OFFICE

STANLEY M. WRIGHT AND ANDREW D. McGILL, OF DENVER, COLORADO

SPINNER FOR FISH LURES

Application filed June 9, 1928. Serial No. 284,088.

This invention relates to a fishing lure more particularly of the type known as a "spinner." The types of spinners at present in use are objectionable because of the fact that the spinning members will cramp or lock themselves to the shaft under the pressure of the water and therefore do not have a positive motion. The principal object of this invention is to provide a spinning member, the operation of which, will be positive and which cannot cramp or lock itself to the shaft.

Present types of spinners are also objectionable because of the fact that vines, weeds, etc. will become entangled with the spinning member and wind about the shaft so as to prevent the spinner from rotating. Another object of the invention is to provide a spinning member, the action of which, will not be interfered with by weeds and stringy material in the water.

A further object of the invention is to provide a four-bladed spinner of special design which will be unusually sensitive to the water currents so that it will spin and impart an animated appearance to the lure when drawn very gently through the water.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Figure 1:
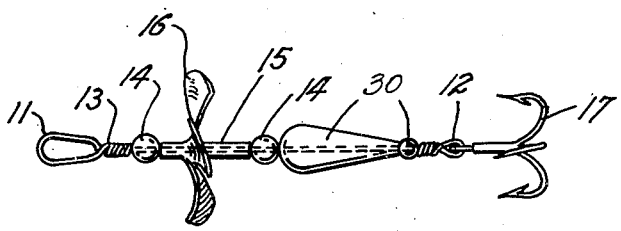
Fig. 1 is a side elevation of one form of my improved fishing lure.
Figure 3:
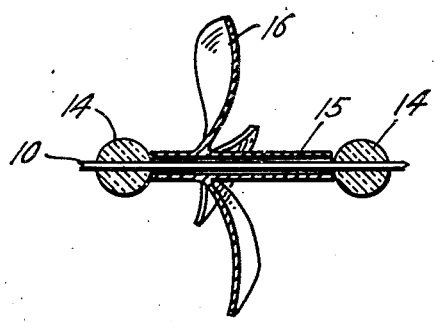
Fig. 3 is an enlarged longitudinal section through the spinning member of the form of Fig. 1.

In the first form of our invention illustrated in Figs. 1 and 3, we employ a wire shaft 10 which extends entirely through the lure terminating in a line loop 11 at one extremity and a hoop loop 12 at its other extremity. The hook loop 12 is designed to receive a fish hook 17 of any desired design. The loops 11 and 12 are formed by bending the wire back and winding it upon itself as shown at 13.

Before forming the loops, a pair of spinner beads 14, spinner sleeve 15, and body beads 30 are strung upon the wire. The spinner beads 14 act as end bearings for the spinner sleeve 15 which is free to rotate about the wire 10. Spinner blades 16 are secured on or formed integrally with the spinner sleeve 15. By this construction the blades 16 are maintained at right angles to the wire 10 regardless of any inequality of pressure upon the beads since the long spinner sleeve 15 prevents them from cramping the wire 10. Thus the operation of the spinner is positive at all times.

With the ordinary spinner weeds will become entangled in the spinner blades and be wound about the lure or wire. In the present invention, should weeds become entangled in the spinner, they become wound about the spinner sleeve 15 where they can do no damage since the sleeve 15 rotates with the blades and carries the entangled weeds around with it.

Figure 2:
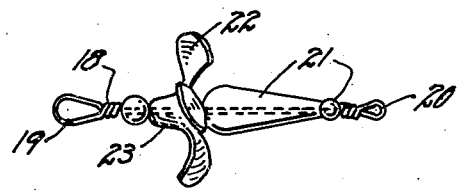
Fig. 2 is a similar view of an alternate form thereof.
Figure 4:
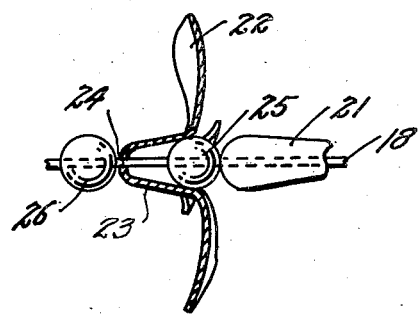
Fig. 4 is a similar enlarged section through the spinning member of the form of Fig. 2.

In the alternate form of the invention illustrated in Figs. 2 and 4, the same principles are carried out in the construction. In this form a central wire 18 is employed similarly to the first form. The wire 18 terminates in a line loop 19 and a hook loop 20 and is provided with body beads 21 of any desired design. The spinner in this form of the invention is different in construction from the previously described spinner and comprises blades 22 projecting from the edges of a conically depressed portion 23.

In the top of the conical portion 23 an opening 24 is formed for the passage of the wire 18. A bearing bead 25 is carried within the other extremity of the conical portion and serves as a bearing for that extremity, thus the spinner has two spaced-apart bearings, the hole 24 and bead 25, so that it can not swing or cramp against the wire. A second bearing bead 26 acts as an end bearing and separates the spinner from the line loop 19.

Figure 5:
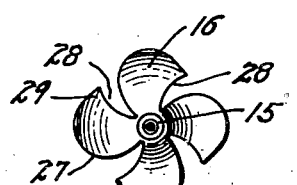
Fig. 5 is a face view of the spinning member. The same general design is employed in both forms of the invention.

It is desired to call attention to the special construction of the spinner blades 16 and 22, as illustrated in Fig. 5. The spinners illustrated are of the four-bladed type and it has been found that this type of spinner is more positive and satisfactory than one having a a lesser number of blades. The invention, however, is not limited to any particular number of blades but would retain its advantages with one or more blades.

The blades are formed with a different outline than the usual spinner or propeller blades. The two sides of the blades swing backwardly from the direction of rotation as indicated at 27 and 28. The forward side, 27, is turned completely around the end of the blade joining the rearward side 28 in a slightly pointed extremity 29, at the rear of the blade.

By this construction the spinner is practically "weed proof" for, as the blades rotate, the curved forward edge will force the weeds outwardly and allow them to pass off from the pointed extremity 29. There is nothing on the forward edges which would engage or hold the weeds. The pointed extremity 29 also increases the pressure area on the blades at a distance from the axis so as to impart more power to its rotation.

The ordinary spinner will operate only when drawn forwardly through the water. Our improved spinner operates equally well regardless of the direction of travel. This is an advantage in trout fishing for the reason that in this class of fishing the spinner is thrown upstream against the current of the water, the downward moving current, therefore, passes forwardly by the spinner and will impart a reverse rotation thereto until it has passed the casting point, when the current will flow rearwardly past the spinner and impart a forward rotation thereto. Thus the spinner rotates constantly either in one direction or the other regardless of the direction of flow of the water current.

While a specific form of the improvement has been described and illustrated herein, it is desired to be understood that the same may be varied, within the scope of the appended claims, without departing from the spirit of the invention.

Having thus described the invention, what we claim and desire secured by Letters Patent is—

1. A spinner for fishing lures having a central shaft comprising: a bladed impeller; an indented portion on said impeller having an opening in its extremity to receive said shaft; and a bead carried on said shaft and arranged to be positioned within said indented portion so as to contact at its periphery with said impeller so as to maintain the latter in alignment with said shaft.

2. Blades for fishing lure spinners comprising: a blade member, the entering edge of which is curved in a substantially uniform curve from the axis backwardly from the direction of rotation to a point at the rear of said blade and a following edge curved backwardly from the direction of rotation to a connection with said forward edge said connecting point forming a relatively sharp projection at the rear of said blade and a sleeve secured to said blade and extending substantially forwardly and rearwardly therefrom so as to maintain it at a fixed projecting angle.

3. A blade for fishing lure spinners comprising: a blade member adapted to rotate about a shaft; a projecting portion on the rearward edge of said blade member, said projecting portion being formed by bringing the forward edge of the blade impeller around in a uniform curve to a position in the rear of said blade where it joins the rearward edge said rearward edge being curved in the same direction as said forward edge but on a greater radius.

4. Blade construction for spinning fish lures comprising: a blade member; a projection formed at the axis of said blade member; a bearing in the extremity of said projection; a bead forced into the mouth of said projection so as to contact with and space said blade member equally from its axis, said bead having an opening in alignment with the opening in said projection.

In testimony whereof, we affix our signatures.

STANLEY M. WRIGHT.
ANDREW D. McGILL.